United States Patent
Yan

(10) Patent No.: US 10,342,330 B2
(45) Date of Patent: Jul. 9, 2019

(54) COLLAPSIBLE AND SHIPPABLE BASE ASSEMBLY SUCH AS INCORPORATED INTO A POPCORN CART INCLUDING A LOWER WHEELED SUPPORT FRAME AND AN UPPER POPCORN KERNAL POPPER ASSEMBLY AND CABINET AND INCLUDING A KIT INCORPORATING SUCH A COLLAPSIBLE AND SHIPPABLE BASE ASSEMBLY

(71) Applicant: DTX INTERNATIONAL, INC., Mancelona, MI (US)

(72) Inventor: Xue Hong Yan, Guangzhou (CN)

(73) Assignee: TRADEMARK GLOBAL, LLC, Lorain, OH (US)

( * ) Notice: Subject to any disclaimer, the term of this patent is extended or adjusted under 35 U.S.C. 154(b) by 463 days.

(21) Appl. No.: 15/220,076

(22) Filed: Jul. 26, 2016

(65) Prior Publication Data

US 2018/0027959 A1  Feb. 1, 2018

(51) Int. Cl.
*A47B 31/02* (2006.01)
*A47B 47/00* (2006.01)
(Continued)

(52) U.S. Cl.
CPC .............. *A47B 31/02* (2013.01); *A23L 7/187* (2016.08); *A47B 47/00* (2013.01);
(Continued)

(58) Field of Classification Search
CPC .............. A47B 31/02; A47B 2031/003; A47B 2031/004; A47B 47/00; A23L 7/187; A23V 2002/00
(Continued)

(56) References Cited

U.S. PATENT DOCUMENTS

D52,834 S   12/1918  Wallace
D95,121 S    4/1935  Cretors
(Continued)

FOREIGN PATENT DOCUMENTS

GB          2482529 A    2/2012

*Primary Examiner* — Dana Ross
*Assistant Examiner* — Kuangyue Chen
(74) *Attorney, Agent, or Firm* — Dinsmore & Shohl LLP

(57) ABSTRACT

A base assembly integrated into an appliance including a lower frame and an upper operating component. A plurality of inter-assembleable and planar shaped members include each of a bottom and upwardly supported and interconnected front, back and sides, these collectively defining an enclosure having an upper surface adapted to support the operating component and a lower surface adapted to secure upon the lower frame. Mounting hardware including at least a plurality of threaded fasteners secures the bottom to locations along the front and back. Pluralities of vertically spaced tabs and opposing vertically spaced slots are configured along each of opposite edges of the sides and along each of first and second pairs of opposite edge extending brackets secured to each of the front and back and which overlap the side edges. The planar shaped members and mounting hardware are adapted to being shipped in a first flat-packed arrangement and subsequently assembled on site in a second use arrangement.

4 Claims, 5 Drawing Sheets

(51) Int. Cl.
  *A23L 7/187* (2016.01)
  *A47B 31/00* (2006.01)
(52) U.S. Cl.
  CPC ..... *A23V 2002/00* (2013.01); *A47B 2031/003* (2013.01); *A47B 2031/004* (2013.01)
(58) Field of Classification Search
  USPC .............................................. 99/323.5–323.9
  See application file for complete search history.

(56) References Cited

U.S. PATENT DOCUMENTS

| | | |
|---|---|---|
| D128,387 S | 7/1941 | Wheeler |
| D163,497 S | 5/1951 | Waas |
| D177,456 S | 4/1956 | Altemiller |
| 3,294,276 A | 12/1966 | Kemp et al. |
| D208,743 S | 9/1967 | Heilweil et al. |
| D279,069 S | 6/1985 | Goodlaxson |
| 4,573,401 A | 3/1986 | Goodlaxson |
| 5,279,086 A * | 1/1994 | Liao .......... E06B 7/02 49/505 |
| 5,301,601 A | 4/1994 | Cretors |
| 5,711,208 A | 1/1998 | Wood et al. |
| 6,460,451 B1 * | 10/2002 | Helman .......... A23L 7/187 99/323.5 |
| D523,606 S * | 6/2006 | Brekke .......... D34/19 |
| D552,405 S | 10/2007 | Bond |
| D570,067 S * | 5/2008 | Chan .......... D34/14 |
| D628,847 S | 12/2010 | Liu |
| 7,874,244 B1 | 1/2011 | Rhome |
| D722,245 S | 2/2015 | Mao |
| 2003/0173875 A1 * | 9/2003 | Saravis .......... A47B 47/0033 312/111 |
| 2008/0295701 A1 | 12/2008 | Richter |
| 2011/0088562 A1 | 4/2011 | Korin |
| 2013/0276640 A1 | 10/2013 | Cretors |
| 2013/0276641 A1 | 10/2013 | Vidojevic |
| 2013/0280386 A1 | 10/2013 | Cretors |
| 2015/0082992 A1 * | 3/2015 | Johnson .......... A23L 7/187 99/323.5 |
| 2015/0082994 A1 | 3/2015 | Johnson et al. |

* cited by examiner

COLLAPSIBLE AND SHIPPABLE BASE ASSEMBLY SUCH AS INCORPORATED INTO A POPCORN CART INCLUDING A LOWER WHEELED SUPPORT FRAME AND AN UPPER POPCORN KERNAL POPPER ASSEMBLY AND CABINET AND INCLUDING A KIT INCORPORATING SUCH A COLLAPSIBLE AND SHIPPABLE BASE ASSEMBLY

FIELD OF THE INVENTION

The present invention relates generally to a collapsible and shippable base supporting structures, such as for integration into a popcorn cart including a lower wheel supported frame and an upper combination kernel popper and cabinet module. More particularly, the present invention includes such an assembly as well as a corresponding kit for providing such a collapsed/shippable base assembly which is subsequently assembleable with the lower wheeled frame and upper kernel popper/cabinet module.

BACKGROUND OF THE INVENTION

Popcorn making assemblies are known in the art and which include both the fixed/stationary variety as well as the wheeled or traversable type, such as which is further useful for providing such product such as at carnivals, fairs or other public/private events in which it is desirable to provide mobility to the assembly. The traditional popcorn box body is an integral type, which is not convenient to disassemble and/or transport. U.S. Pat. No. 4,573,401, to Goodlaxson, teaches a corn popping machine and method of assembling the same.

SUMMARY OF THE INVENTION

The present invention discloses a modular or assembleable support base for integration into such as a popcorn cart including a lower wheel supported frame and an upper combination popcorn kernel popper and cabinet module. The lower frame secures to an underside of the assembleable base or cabinet and includes such as a rear pair of wheels and a forward pair of vertical pedestals, such defining frictional stop locations upon a ground surface and, upon tilting the frame about an axis defined by the wheels, permitting traversing of the popcorn cart. The upper combination module (for the illustrated embodiment) further depicts a conventional popcorn kernel cooker assembly suspended over a clear glass/plastic enclosed cabinet for collecting a volume of popped corn for dispensing through any of an exteriorly accessible door or gate.

The collapsible/detachable and intermediately positioned support base defines a three dimensional rectangular and open top body having each of a bottom connecting plate and inter-assembleable front, back and side plates. A plurality of corner mounts are formed on an underside of the bottom connecting plate for receiving the four vertical extending elongated members associated with the lower wheeled frame. Support ledges are defined upon inner facing horizontal surfaces of the front and back plates for seating the bottom connecting plate and, in combination with pluralities of opposing and inter-engaging tab and slot portions define along the edges of each of the front, back and side plates provide for quick assembly of the support base assembly.

Additional screw fasteners and receiving nuts can also be provided at aligning locations established between an angled outer flange of the bottom connecting plate and overlapping side bracket locations associated with at least the front and back plates in order to provide additional structural integrity between inter-assembled components. A hinged door is further configured upon the front plate as shown for gaining access to the interiorly held contents.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
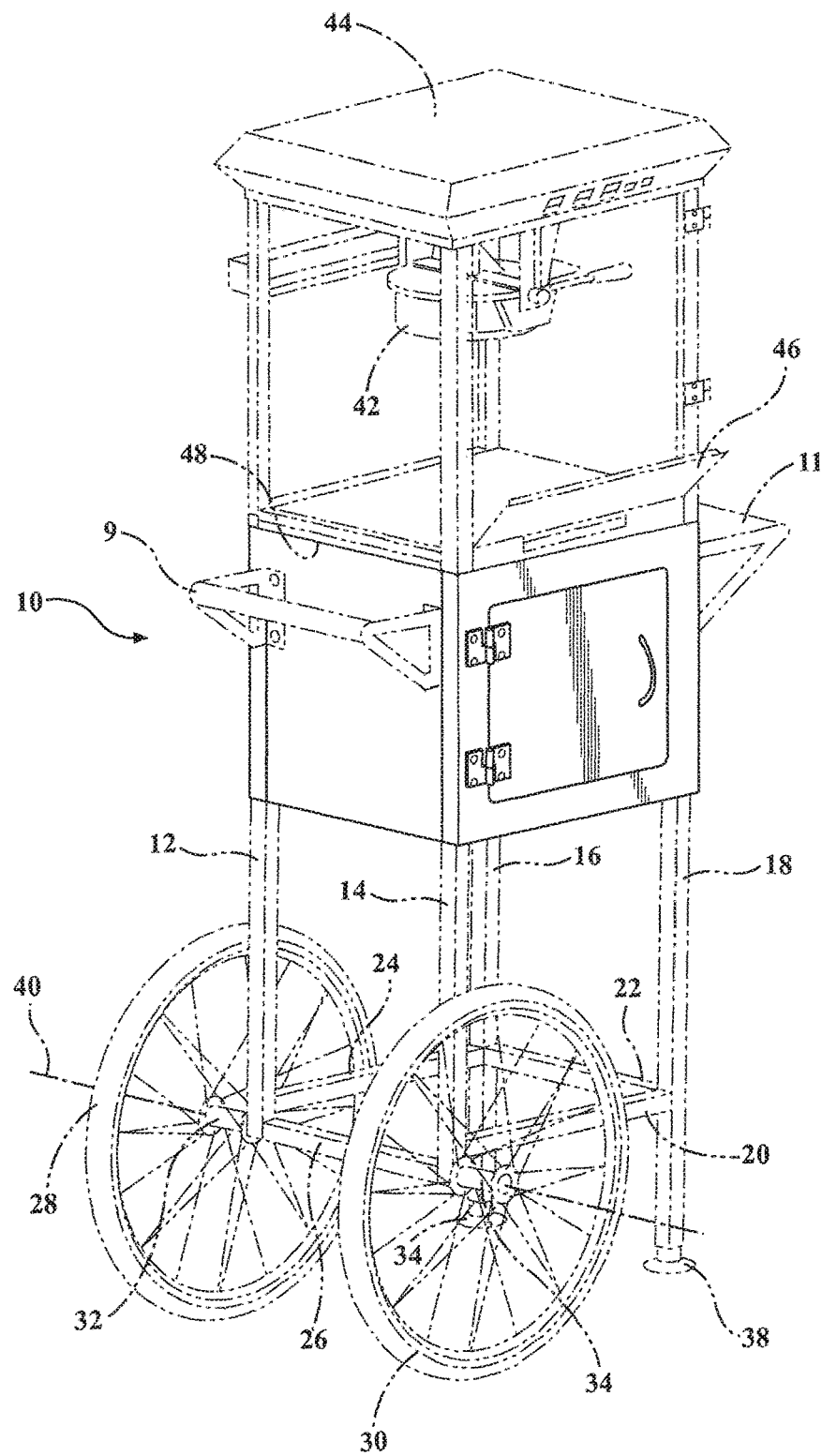
FIG. 1 is an environmental illustration of the assembleable support base of the present invention integrated into a wheel supported popcorn cart according to one non-limiting embodiment.
Figure 2:
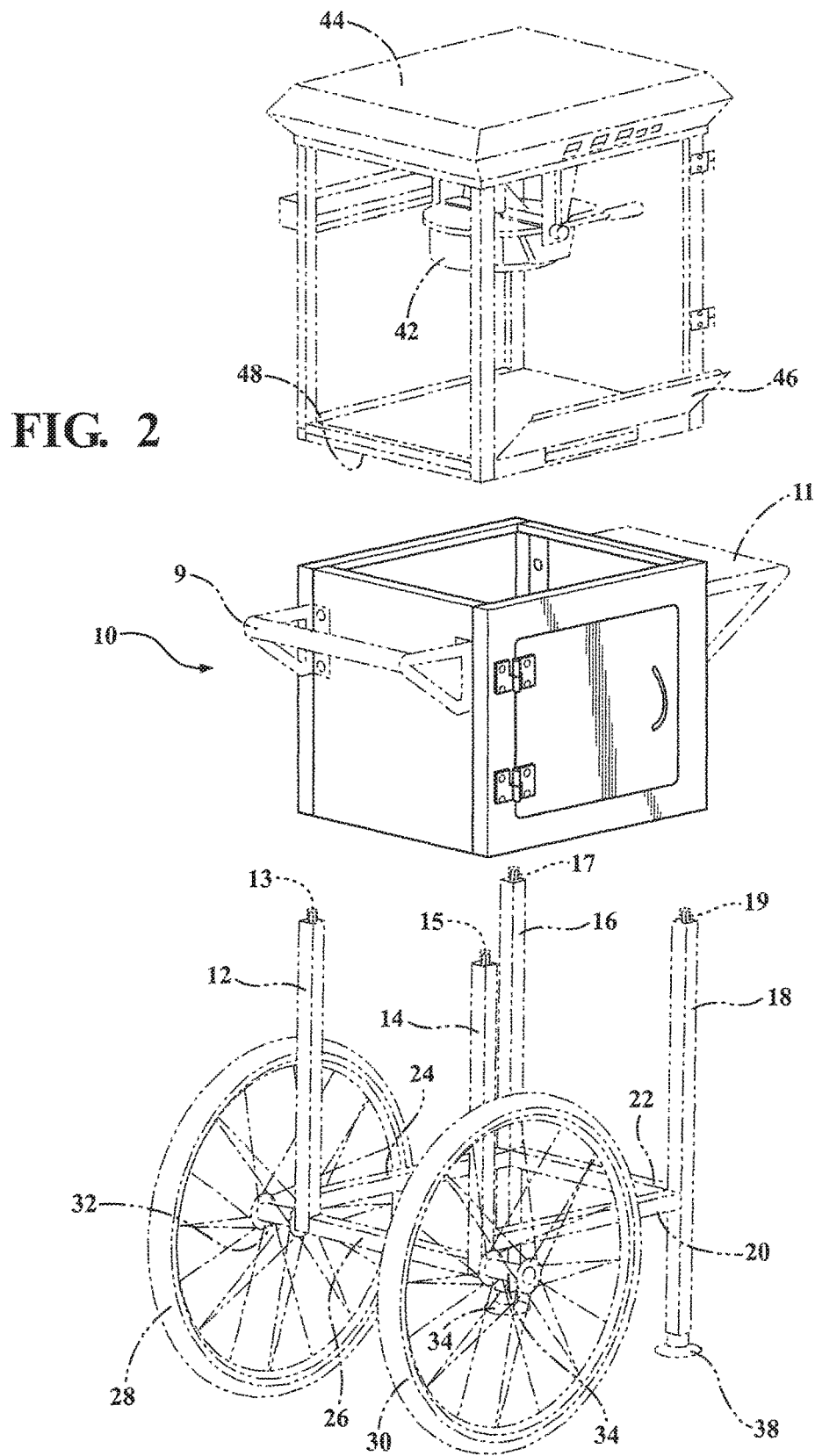
FIG. 2 is an exploded perspective of FIG. 1 and illustrating the support base with exterior grip and shelf attachments removable from the lower wheel supported frame and upper supported popcorn kernel popper and cabinet.
Figure 3:
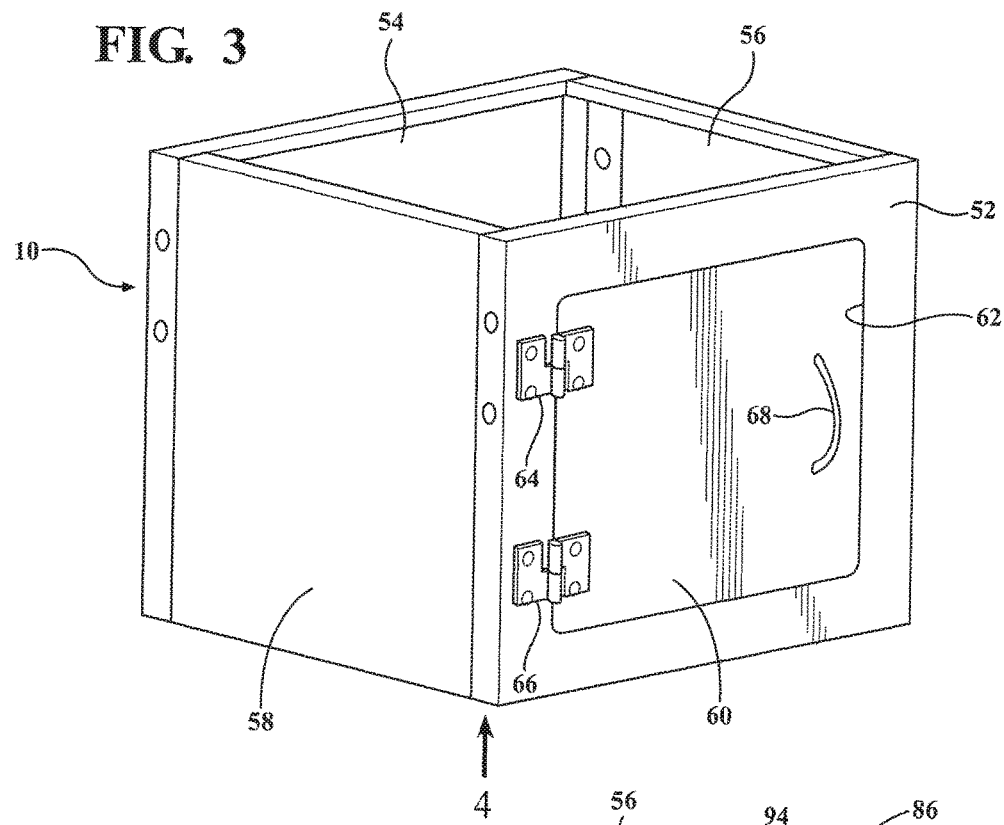
FIG. 3 is an enlarged perspective of the support base of the present invention in an assembled condition.

With reference to the attached illustrations, the present invention discloses a modular or assembleable support base, see generally at 10 in each of FIGS. 1-3, for integration into such as a popcorn cart. As will be described in further detail, an advantage of the collapsible support base assembly is that it permits shipping in a flat packed arrangement, see at 10' in FIG. 7, which reduces the size of the packaging (see phantom outline of box 2) which is necessary to transport the assembly.

FIG. 1 is an environmental illustration of the assembleable support base 10 of the present invention integrated into a wheel supported popcorn cart according to one non-limiting embodiment, with FIG. 2 further providing an exploded perspective of FIG. 1 and illustrating the assembled support base 10 with exterior grip 9 and shelf 11 attachments, such depicted in phantom, removable from the lower wheel supported frame and upper supported popcorn kernel popper and cabinet;

Prior to describing the collapsible support base in additional detail, a further description will now be had of the lower wheeled frame and the upper kernel popper/cabinet components, these being illustrated in each of FIGS. 1-2. The present inventions contemplate the use of the collapsible base 10 with any wheeled or fixed/stationary appliance not limited to the popcorn cart shown and with which it is desirable to provide a compact, easily shippable and assembleable base enclosure as a component of such an appliance, kit and/or assembly.

Referring again to FIGS. 1-2, the popcorn cart includes a lower wheel supported frame, including vertical supports 12, 14, 16 and 18 (these engaging the underside of the base assembly 10 through such as the use of associated top end projecting threaded studs or the like as shown at 13, 15, 17 and 19 in FIG. 2 as will be further described), horizontal interconnecting supports 20, 22, 24 and 26, and wheels 28 and 30 respectively mounted to collinear shaft extensions 32 and 34 from and along a rear 26 of the horizontal interconnecting supports. The lower frame secures to an underside of the assembleable base or cabinet, such that the rear pair of wheels 28 and 30 and forward pair of vertical pedestals, such exhibiting bottommost pads 36 and 38 defining frictional stop locations upon a ground surface and, upon tilting the frame about an axis 40 defined by the center point of rotation of the wheels, permitting traversing of the popcorn cart.

The upper combination module (for purposes of the present invention being generally referred to as the operating assembly or component) further depicts a conventional popcorn kernel cooker assembly, see at 42, which is mounted to an underside of a roof or top 44 forming a portion of a three dimensional rectangular shaped and clear glass/plastic enclosed cabinet, such as exhibiting see-through sides which collect a volume of popped corn for dispensing rough any of an exteriorly accessible door or gate, further at 46. For purposes of the present description, additional explanation as to the operation and features of the popcorn kernel cooker 42 are unnecessary, except as to state that it can be provided as an existing assembly in which its bottom extending perimeter, at 48, is understood to generally match that of the upper opposing perimeter supporting surface of the fast-assembleable base module 10 (see again FIG. 2), and to which it can be mounted using any collection of clamps, clips, fasteners, or the like.

As is now depicted by the collection of views of FIG. 3-6, pertaining directly to the support base, the collapsible/detachable and intermediately positioned support base defines a three dimensional rectangular and open top body having each of a bottom connecting plate 50 and inter-assembleable front 52, back 54 and side 56 and 58 plates. The term "plate" is further understood to be interchangeable with flattened "planar member" or "side", and each of the plates 50-58 can include any of a wood, metal, rigid plastic or composite material.

The front plate 52 further includes a door 60 which mounts to an inner perimeter rim 62 (FIG. 6) via a hinges 64 and 66. Additionally hardware including a handle 68 and mounting screws 70, 72, et seq. are provided during assembly (see also as shipped flat in the packaged view of FIG. 7) and, upon completed assembly, to gain access to the interior of the base assembly 10 which can function as a storage module for the popcorn cart.

Figure 4:
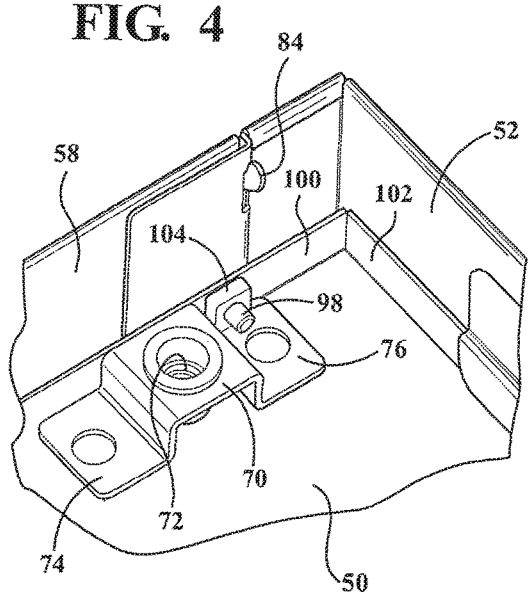
FIG. 4 is an enlarged partial perspective taken along directional arrow 4 of FIG. 3 of a bottom underside corner engagement between the bottom connecting plate and front and left side plates of FIG. 3, the bottom connecting plate further exhibiting a pedestal mount for receiving a vertically extending member of the wheeled frame or pedestal.

FIG. 4 is an enlarged partial perspective taken along directional arrow 4 of FIG. 3 and better showing a bottom underside corner engagement between the bottom connecting plate 50 and each of the front 52 and left side 58 plates of FIG. 3. The bottom connecting plate 50 further exhibits a plurality of four corner located pedestal mounts, one of which is shown at 70 in the form of mounting hardware in the partial view of FIG. 4), such including an interiorly threaded receiving hole 72 for receiving one of the upper end projecting and exteriorly threaded studs 13, 15, 17 and 19 associated with the vertically extending members 12, 14, 16 and 18 of the wheeled frame or pedestal. As further shown, each of the four corner proximate and bottom plate under-side surface pedestal mounts further includes a multiple reverse bended configuration with a spaced/set off middle location incorporating the depth extending receiving hole 72 and configured to receive the the stud end 13, 15, 17 or 19 of the associated pedestal mount, outer most flattened portions, at 74 and 76, providing mounting surfaces to affixing to the underside of the bottom plate 50.

Viewing again FIGS. 4-6 in combination, an arrangement of tabs/slots integrated into opposing edge assembling surfaces of the bottom 50 and upper enclosure defining 52-56 plates or members, and in combination with additional attachment hardware, will now be discussed for quickly assembling the support base assembly 10 from the collapsed/shipping condition of FIG. 7 to the assembled/use position of FIG. 3. This includes elongated support ledges defined upon inner facing horizontal surfaces of the front 52 and back 54 plates (one of which being shown at 78 in horizontal and lower edge proximate extending fashion for backplate 54) for seating and supporting an opposing extending side edge of the bottom connecting plate 50.

Also shown are pluralities of opposing and inter-engaging tab and slot portions define along the edges of each of the front 52, back 54 and side 56 and 58 plates provide for enabling quick assembly of the support base assembly 10. This includes angled and curved mounting tabs which are integrally formed with inside extending edges of each side plate 56 and 58, These shown by individual pluralities of vertically spaced and inwardly projecting tabs 80 and 82 exhibited along the outermost side extending edges of the selected side plate 56, a further like plurality of vertically spaced tabs 84 being illustrated for opposing side plate 58 (the other extending edge pattern being obscured in that view).

Figure 5:
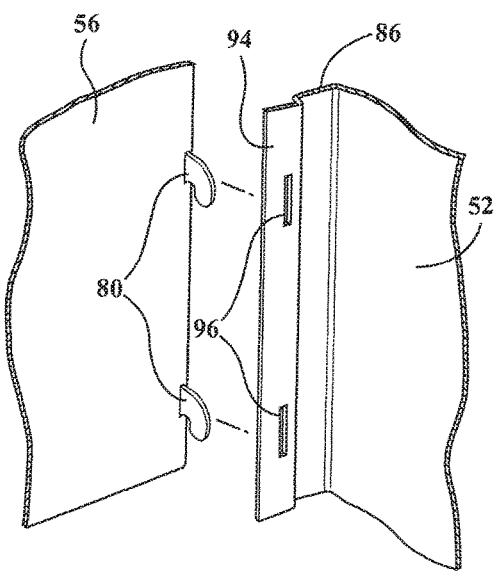
FIG. 5 is a further illustration of a vertical side edge engagement location established between inner overlapping locations associated with the base assembleable components.

As best shown in the partial illustration of FIG. 5, selected engagement tabs 80 associated with side plate 56 is are again shown and which, during a final assembly stage, secure through aligning apertures associated with edge brackets which extend perpendicularly inwardly relative to each of the front 52 and back 54 plates. As best shown in FIG. 6, the front plate 52 includes a first pair of vertical edge extending brackets 86 and 88, with the rear or back plate 52 including a second opposing pair of vertical brackets 90 and 92, between which are supported and edge-overlapped the vertical extending side edges of the side plates 56 and 58 with their vertical tab arrays.

As again best shown in FIG. 5, the selected edge angled bracket 86 associated with front plate 52 (and which can equally depict an opposite corner representation between the hidden vertical side edge of opposite side plate 58 and aligning bracket 92 associated with the rear plate 54) can include any of a flattened or stepped cross sectional profile. This is further depicted by inner stepped and outer most lateral extending portion 94 associated with vertical bracket 86, and within which are configured vertically extending slots (see rectangular shaped at 96 in FIG. 5), these aligning with the curved underside profiles of selected tabs 80. Without limitation, the arrangement of tabs and slots depicted in FIGS. 4 and 6 can be reversed from that shown and such that the slots can be configured along opposite vertically extending edges of the sides 56 and 58 and the tabs being repositioned in exteriorly projecting fashion from the inner stepped mounting surfaces (again at 94 in FIG. 5) of the front and back edge mounted brackets.

Prior to finished assembly of the base support assembly 10, utilizing the vertically extending tabs and slots, a collection of additional screw fasteners and receiving nuts are provided for pre-assembling the front 52 and rear 54 plates to the bottom connecting plate 50. This includes aligning locations established between angled outer edge of the bottom connecting plate and the overlapping side brackets 86/88 and 90/92 associated with at least the front 52 and back 54 plates, and which additionally provides structural integrity between inter-assembled components. Any collection or screw or bolt fastener, such as shown by pairs of threaded bolts 98 in FIG. 6, are provided in aligning fashion with lower side locations of the bracket 86/88 and 90/92 of the front 52 and rear 54 plates.

Figure 6:
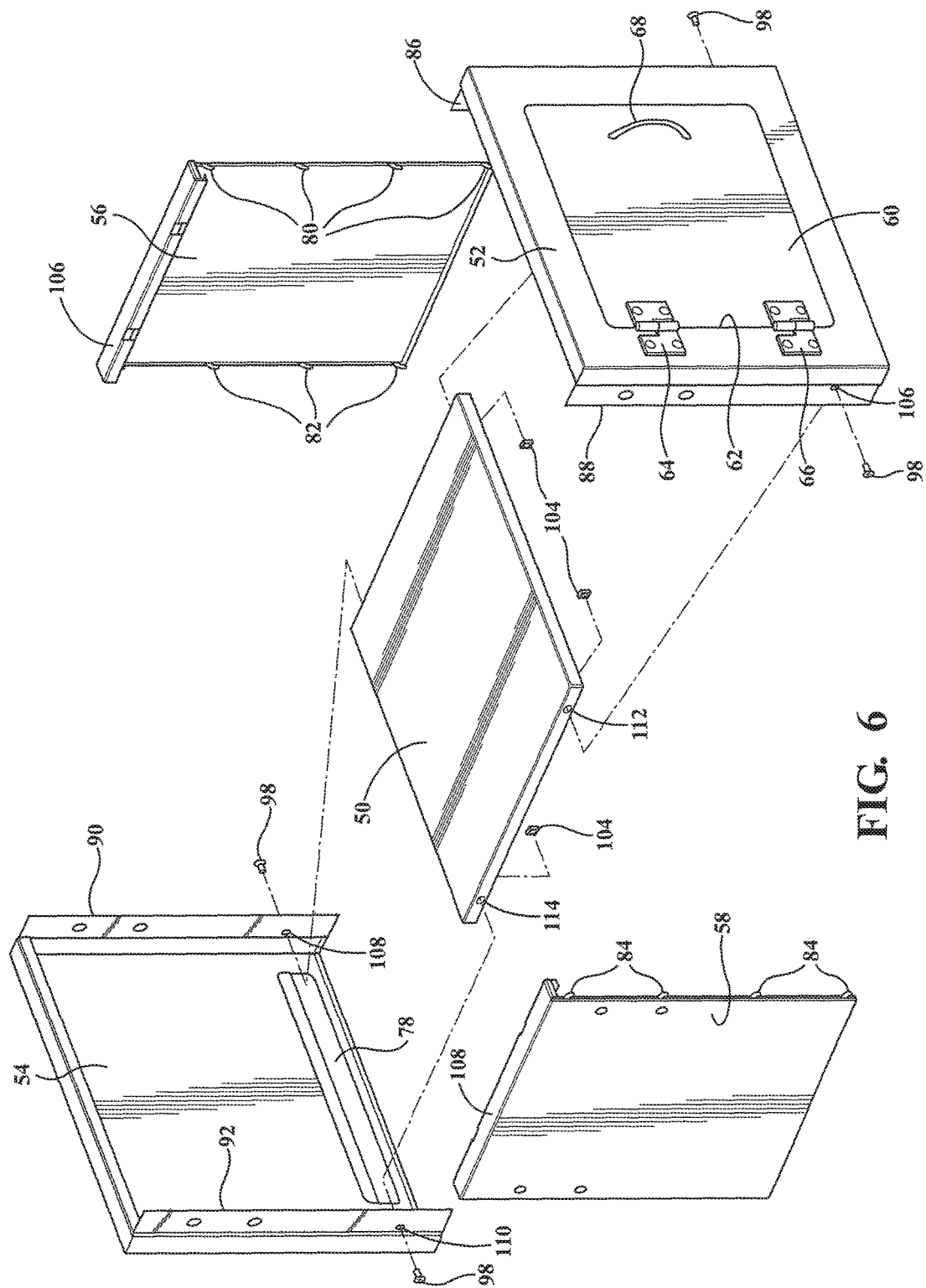
FIG. 6 is a further exploded view of the support base of FIG. 3.
Figure 7:
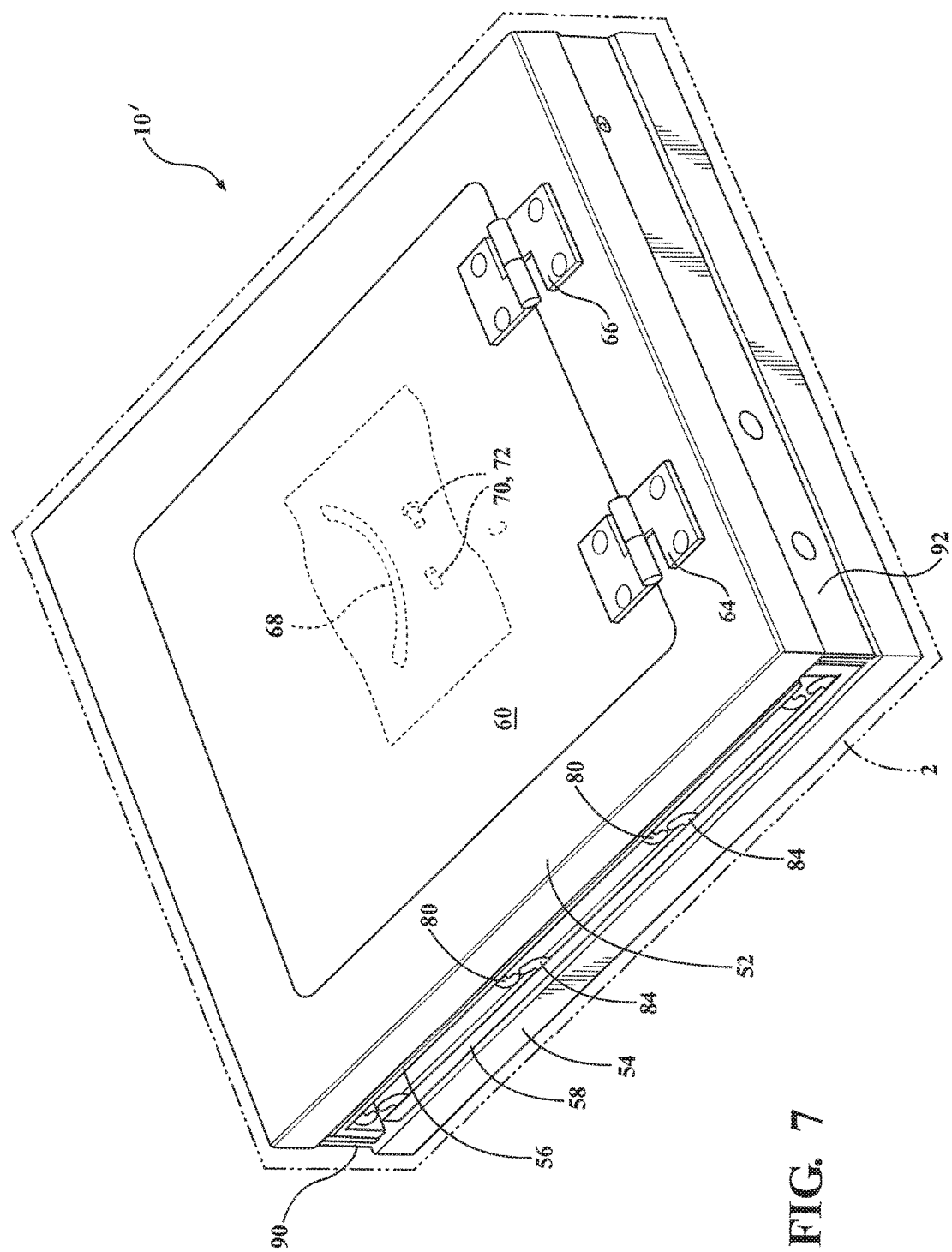
FIG. 7 is a collapsed packaged view of the support base in a shipping condition and prior to assembly.

The bottom plate 50 further includes an outer angled flange or skirt, such being hidden in the upper side perspective of FIG. 6 but depicted by interconnecting skirt edges 100 and 102 in FIG. 4. Attachment nuts 104 are further shown in FIGS. 4 and 6 and, upon aligning overlapping apertures in each of lower locations of the brackets and skirt edges of the bottom plate 50 (see aperture 106 for selected bracket 88 of front plate 52 and further apertures at 108 and 110 for brackets 90/92 of rear plate 54, which aligns with apertures such as shown at 112 and 114 in selected exposed skirt edge of the bottom plate 50 as depicted in FIG. 6), the threaded stems of the fasteners 98 are inserted through the overlapping pairs of apertures, so that the outer heads abut against the exterior surface or the inner stepped ends (again at 94) of the side brackets and the nuts 104 affix over the portions of the exteriorly threaded stems which project beyond the inside surface of the adjoining skirts (again 100, 102 in FIG. 4) of the bottom connecting plate 50.

Accordingly, and following pre-assembly as dictated by the upon pre-aligning the front and rear outer edges of the bottom plate 50 to seat upon the ledges (one of which again shown at 78) of the front 52 and rear 54 plates, the bottom plate 50 is mounted to the front 52 and rear 54 plates utilizing the fasteners 98 and end attachment nuts 104. Following this, the side plates 56 and 58 are affixed to the overlapping bracket edges 86/88 and 90/92 of the front and rear plates (again via the progressive inward inserting and vertical seating motion of the tabs through the slots as depicted in FIG. 5) order to establish a self-supporting assembly arrangement of the base support assembly 10 in the manner depicted by FIG. 3. As also shown in each of FIGS. 3 and 6, the uppermost horizontal edges of the sides 56 and 58 may further include upper edge extending portions 106 and 108, these providing some measure of overlapping and upper rim edge support for receiving the popcorn cooker operating component, as further again defined by bottom supporting rim edge 48 in FIGS. 1-2.

Beyond that embodiments illustrated, it is further envisioned and understood that the assembleable support base is further adapted to being integrated into any other appliance construction, both fixed and traversable, and with which it is desirable to provide for any easily collapsible and shippable enclosure defining body forming a part of such an appliance or assembly. Having described my invention, other and additional preferred embodiments will become apparent to those skilled in the art to which it pertains, and without deviating from the scope of the appended claims:

I claim:
1. An assembleable popcorn cart, comprising:
   a lower wheeled frame including a plurality of vertically extending supports;
   an upper operating component further including a conventional popcorn kernel cooker assembly mounted to an underside of a roof and forming a portion of a three dimensional rectangular shaped and clear glass/plastic enclosed cabinet;
   a base assembly positioned between said lower wheeled frame and said upper operating component, said base assembly including a plurality of inter-assembleable and planar shaped members including each of a bottom and upwardly supported and interconnected front, back and sides, these collectively defining an accessible enclosure, said base assembly having an upper rim surface upon which is supported an underside extending rim of said operating component, said base assembly further including corner pedestal mounts for securing said vertically extending supports of said lower wheeled frame;
   mounting hardware for inter-assembling said bottom, front, back and sides of said base assembly and including at least a plurality of threaded fasteners for securing said bottom to lower edge horizontal locations along said front and back;
   pluralities of vertically spaced tabs and opposing vertically spaced slots configured along each of opposite edges of said sides and along each of first and second pairs of opposite edge extending brackets secured to each of said front and back and which overlap said side edges;
   at least said planar shaped members and mounting hardware of said base assembly adapted to being shipped in a first flat-packed arrangement and subsequently assembled on site in a second use arrangement; and
   said bottom further including an outer angled skirt, said mounting hardware further including nuts and, upon aligning overlapping apertures in each of lower locations of said first and second pairs of opposite edge extending brackets with edges of said outer angled skirt, threaded stems of said fasteners being inserted through the overlapping pairs of apertures and said nuts affixing to said stems which project beyond inside surfaces of said skirts.

2. The popcorn cart as described in claim 1, further comprising a door configured into at least one of said front, back or sides of said base assembly for accessing said enclosure.

3. The popcorn cart as described in claim 1, each of said vertically extending supports of said lower wheeled frame further comprising an upper end projecting and exteriorly threaded stud, said corner pedestal mounts each further including an interiorly threaded receiving hole for receiving said upper end projecting and exteriorly threaded studs.

4. The popcorn cart as described in claim 1, further comprising elongated support ledges defined upon inner facing horizontal surfaces of said front and back for seating and supporting opposing extending side edges of said bottom prior to installation of said mounting hardware.

\* \* \* \* \*